United States Patent [19]
Kohl et al.

[11] Patent Number: 5,352,929
[45] Date of Patent: Oct. 4, 1994

[54] APPARATUS AND METHOD FOR REGULATING A GENERATOR OF AN INTERNAL COMBUSTION ENGINE

[75] Inventors: Walter Kohl, Bietigheim; Friedhelm Meyer, Illingen; Rainer Mittag, Kornwestheim; Helmut Suelzle, Benningen, all of Fed. Rep. of Germany

[73] Assignee: Robert Bosch GmbH, Stuttgart, Fed. Rep. of Germany

[21] Appl. No.: 83,673

[22] Filed: Jun. 25, 1993

[30] Foreign Application Priority Data

Jul. 4, 1992 [DE] Fed. Rep. of Germany ....... 4222072

[51] Int. Cl.$^5$ .................. H02P 9/08; F02N 11/04; H02J 7/16
[52] U.S. Cl. .................. 290/36 R; 290/37 R; 322/60; 322/88
[58] Field of Search ............ 290/36 R, 37 R; 322/28, 322/88, 60

[56] References Cited

U.S. PATENT DOCUMENTS

| | | | |
|---|---|---|---|
| 4,301,376 | 11/1981 | Ragaly | 290/36 R |
| 4,463,305 | 7/1984 | Wineland et al. | 322/10 |
| 5,107,198 | 4/1992 | Meyer et al. | 322/88 |

FOREIGN PATENT DOCUMENTS 4108751  9/1991  Fed. Rep. of Germany .

OTHER PUBLICATIONS

"Kraftfahrtechnisches Taschenbuch", 18th Edition, Bosch, 1976, pp. 362-363 and pp. 372-373.

*Primary Examiner*—A. D. Pellinen
*Assistant Examiner*—Robert Lloyd Hoover
*Attorney, Agent, or Firm*—Michael J. Striker

[57] ABSTRACT

The apparatus for controlling an output voltage of a generator of an internal combustion engine having a starter device, includes a charge control signaling device, an excitation coil for the generator and a voltage regulator controlling an excitation current in the excitation coil and an excitation current limiting device for limiting the excitation current during a predetermined starting phase ($\Delta t_1$) connected to the voltage regulator. The excitation current limiting device detects whether the engine is in a starting phase. If the engine is in a starting phase, the excitation current limiting device reduces the excitation current so that a voltage is produce at generator terminal D+ which permits no load current and simultaneously guarantees that the charge control signalling device is shut off. After ending of the starting phase the excitation current limiting device is shut off and the excitation current is increased to its standard value, which results in a generator output voltage which is above the power supply voltage that charges the battery.

18 Claims, 1 Drawing Sheet

APPARATUS AND METHOD FOR REGULATING A GENERATOR OF AN INTERNAL COMBUSTION ENGINE

BACKGROUND OF THE INVENTION

The present invention relates to an apparatus and method for regulating a generator of an internal combustion engine.

To supply electrical energy in a motor vehicle generators, which are driven by an engine of the vehicle, are commonly used. These generators are usually three phase generators having an excitation coil, through which an excitation current flows. The voltage regulator controls the excitation current so that the output voltage of the generator is substantially constant and somewhat higher than the nominal battery voltage.

During starting the motor is brought to the required minimum rotation speed by a starter. After the motor reaches this minimum rotation speed the starter is disengaged from the motor. Since the motor must additionally drive the generator, the starting phase is prolonged thereby.

Also after conclusion of the starting phase the rotation speed of the motor can drop in a short time interval due to the switching on of consuming devices with a high power requirement. A conventional generator unit for an engine with a generator driven by it is described, for example, in German Published Patent Application 38 43 161, which is provided with an analyzer circuit or computer, to which operating parameters are input, for example, motor rotation speed, generator voltage, battery voltage and the like and which influences the excitation current of the generator depending on the parameters received by it so that the load for the motor is reduced. Starter monitoring however is not provided in this generator unit. Therefore it cannot perform a reduction of the excitation current during the starting process to shorten the starting process.

SUMMARY OF THE INVENTION

It is an object of the present invention to provide an improved method for controlling an output voltage of a generator of an internal combustion engine that shortens the starting phase and reduces the load on the starter.

It is another object of the present invention to provide an improved apparatus for controlling an output voltage of a generator of an internal combustion engine that shortens the starting phase and reduces the load on the starter.

These objects and others which will be made more apparent hereinafter are attained in an apparatus and method for control of an output voltage of a generator of an internal combustion engine having a starter device, a charge control signalling device, an excitation coil for the generator and a conventional voltage regulator circuit means that controls the excitation current in the excitation coil.

According to the invention, the apparatus also includes means for limiting the excitation current during a predetermined starting phase.

According to the method of the invention, the excitation current of the generator is limited during a predetermined time period in the starting phase, advantageously it is reduced so as to reduce the load on the starter during the starting phase of the engine and/or shorten the starting phase.

The method for controlling the output voltage of a generator driven by an internal combustion engine has the advantage that the starting phase is shortened and the load of the starter is reduced. This advantage is attained, since during a predetermined starting phase the excitation current of the generator is limited by the excitation current limiting means so that the generator is not excited in this phase and thus no additional braking moment is provided against which the starter must work.

The duration of the starting phase and/or the time, during which the excitation current is reduced, is individually selectable and can advantageously be defined as a fixed time interval or as a time until the engine has reached a predetermined rotation speed or until a predetermined signal from the starter is received.

It is particularly advantageous that the excitation current limit can be selected according to the specifications. For example, the means for limiting the excitation current can control the voltage regulator so that the generator voltage UD+ is maintained at a fixed voltage during the starting process so that then no additional generator connections are required.

Another possibility of the excitation current is that the output voltage of the generator during the starting phase is limited to a voltage which is lower than a power supply voltage. When this is the situation, an especially accurate regulation of the generator voltage is possible.

In an advantageous way it is also possible, to analyze the voltage arising at the generator terminal DF and to limit that voltage so that its value is slightly under a peak voltage at the generator terminal DF.

It is also particularly advantageous when the excitation current is continuously increased after ending of the starting phase until the standard set value of the excitation current is reached so that it is guaranteed that no voltage discontinuity occurs at the generator which would overload sensitive electronic components.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
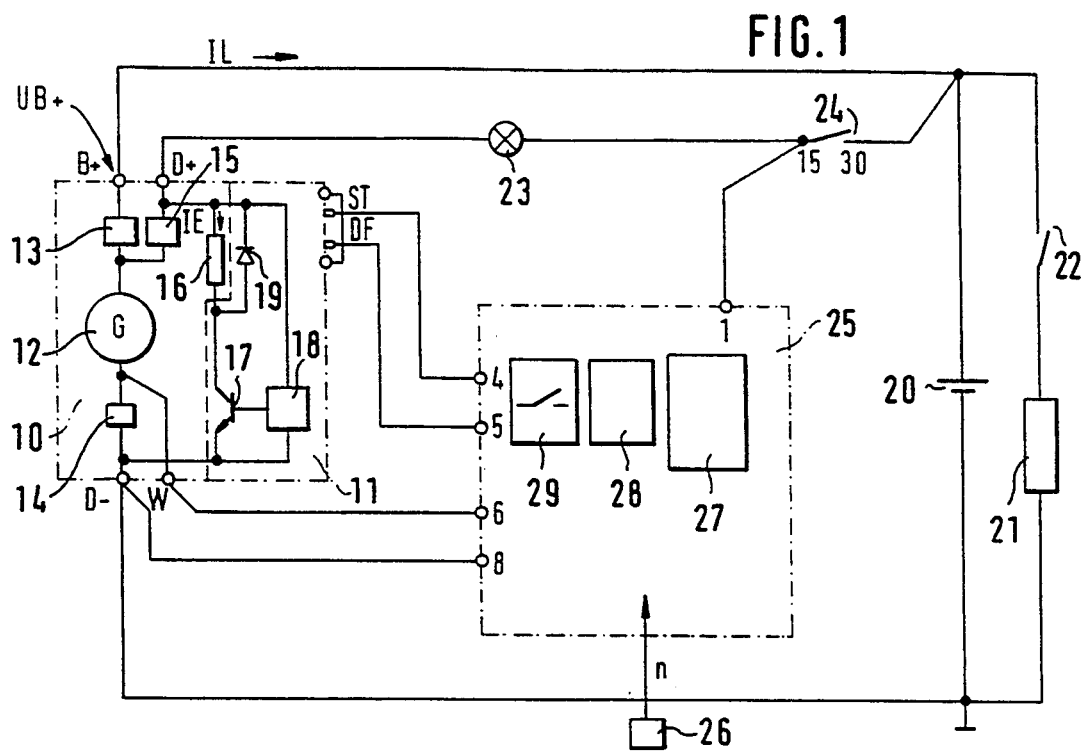
FIG. 1 is a diagram of one embodiment of an apparatus for control of an output voltage of a generator of an internal combustion engine according to the invention.

The generator system according to the invention comprises a generator unit 10 and a voltage regulator circuit 11 as shown in FIG. 1. The generator unit 10 includes the generator 12, which is connected by a diode bridge 13 with the terminal B+ of the generator unit 10 and by a diode bridge and/or Zener diode bridge 14 with the terminal D— of the generator unit 10.

The generator unit 10 includes an excitation diode bridge circuit 15, which is connected to terminal D+ and by the exciting winding 16 with the switching transistor 17 of the voltage regulator circuit 11. This voltage regulator circuit 11 has additionally a control means 18, which is connected between the terminals D+ and D$^{31}$ and controls the switching transistor 17. A diode 19 is connected in parallel across the exciting winding 16.

The terminal B+ of the generator unit 10 is connected to the plus pole of the battery 20, whose minus pole is connected to ground. A consuming device 21 is connected in parallel to the battery 20, which is connectable and disconnectable via a switch 22. This consuming device should represent the array of the entire power supply consuming devices.

The terminal D+ of the generator 10 is connected by the charge control signalling means 23 with the ignition switch 24, whose pole remote from the charge control signaling means is connected to the battery 20, while the pole of the ignition switch closest to and connected to the charge control signalling means is connected with an additional controlling device 25.

The additional controlling means 25 is connected by an additional connecting means with the control terminal ST of the voltage regulator circuit 11 and by connecting means with the terminal DF of the voltage regulator circuit 11. An additional connection between the additional controlling means 25 and the terminal W of the generator unit 10 exists as well as an electrical connection between the additional controlling means 25 and the terminal D— of the generator unit, which is also grounded. An engine rotation speed sensor 26 which measures the rotation speed of an internal combustion engine and/or motor is provided. This rotation speed sensor 26 is connected to an input of the additional controlling means 25.

The additional controlling means 25 include at least one means for time determination 27 and means 28 for evaluation of the rotational speed signal from the speed sensor 26, whose position depends on the rotation speed of the motor.

Figure 3:
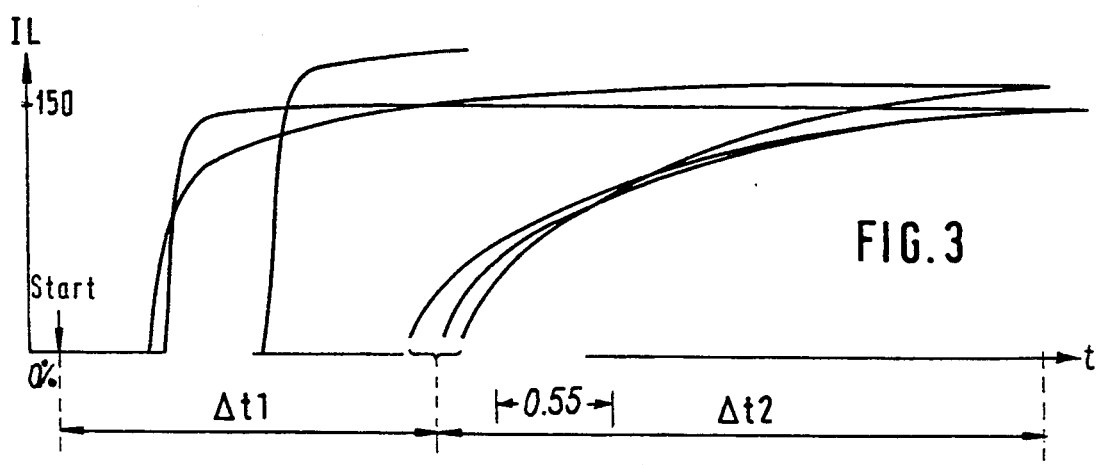
FIG. 3 is a graphical illustration of the method according to the invention showing that the dependence of the load current IL on time with and without excitation current limitation for three experiments.

A generator system is shown in FIG. 1, in which the generator voltage is controlled with the help of a voltage regulator circuit 11 so that it maintains the output voltage constant independent of the generator rotation speed. Also the excitation current flowing through the excitation coil 16 is controlled by the voltage regulator circuit 11. Alternatively or additionally, the excitation current is turned on or off with the help of a switching transistor 17 as required. The dependence of the load current IL supplied by the generator on time with this type of regulation is shown in FIG. 3 with the curves 1, 2 and 3.

According to the invention after turning the engine on, also after closing the ignition switch 24, the voltage regulator circuit 11 controls the excitation current IE for a predetermined time interval Δt1 after closing the ignition switch so that it is not maintained at its standard high value, but is kept at a predetermined smaller value. By preventing generator excitation the generator does not load the engine so that it goes beyond the starting phase quicker. After ending of the starting phase the additional controlling means 25 shuts off and the output voltage of the generator is then controlled in the standard way by the voltage regulator circuit 11.

The determination of the time interval Δt1, during which the excitation current IE is held at a reduced value, can occur according to different methods. One consideration is that the excitation must be adjusted so that the charge control signalling lamp 23 is shut off as quickly as possible and the generator delivers no current to the power supply network. This means that the generator voltage UD+ should be a minimal voltage just below the voltage of the power supply network. Should it be too low, the ratio of UB+/UD+, where UB+ and UD+ are respectively the voltages at the terminal B+ and D+, is too large, so that the charge control signalling lamp is turned on or glows. If it is too high, the generator produces current. Three different methods with various advantages and disadvantages can be used to set the minimal voltage at the D+ terminal.

In the first method a fixed voltage value is defined, which should be applied to the terminal D+. The excitation current is then controlled so that this value occurs exactly. This method has the advantage that no additional connections are required, but the disadvantage that a current can flow in the battery according to the charge state of the battery or can be supplied by the battery so that it is possible that the charge control signal lamp lights or that the generator delivers a reduced current.

In the second method the voltage at D+ (UD+) is set so that it corresponds to the power supply voltage −0.5 volts, i.e. UD+ equals or is set to the conventional power supply voltage −0.5 volts. This method has the advantage that very precise regulation is possible. However it has the disadvantage that the generator system requires an additional connection, by which the power supply voltage is supplied.

In the third method a peak evaluation at DF is defined for a power supply network voltage −0.5 volts. Advantageously no additional connections are required, however considerable effort is required for the regulation.

In all three methods after detection in the additional controlling means 25 of the condition that the starting process has ended or that the time interval Δt1 for the starting phase has elapsed, the excitation current IE continuously increases until the standard regulating voltage, which is somewhat greater than the battery voltage is attained.

For detection of the end of the starting phase, whose duration should be Δt1, the rotation speed of the engine is determined in the additional controlling means 25. This rotation speed is fed from the rotation speed sensor 26 and fed to the additional controlling means 25. By comparison of the actual rotation speed with a predetermined threshold value of the rotations speed whether the starting process is taking place or has already ended can be determined in the additional controlling means.

The end of the starting phase can also be detected, when for example a time measurement occurs in the additional controlling means 25, which delivers a suitable signal after expiration of the Δt1. Other possibilities for detection of the end of the starting phase are possible, for example by detection of the coupling of the starter, which produces a characteristic signal or by other signals, which are characteristic of the end of the starting process.

The detection of the end of the starting phase leads also to a switching of the switch means 29 so that after that the excitation current is increased.

A smooth transition is possible for changing from reduced excitation to the standard excitation. The smoothest possible transition can occur with the help of characteristic values stored in the additional controlling means 25. This transition from reduced excitation current to standard excitation current occurs during a time interval designated with Δt2.

In FIG. 3 the course of the load current 4, 5 and 6 is shown, in which the excitation current is kept reduced during the time interval Δt1 and after elapse of the time interval Δt1 inside of a time interval Δt2 a transition to the standard excitation current IE occurs.

Figure 2:
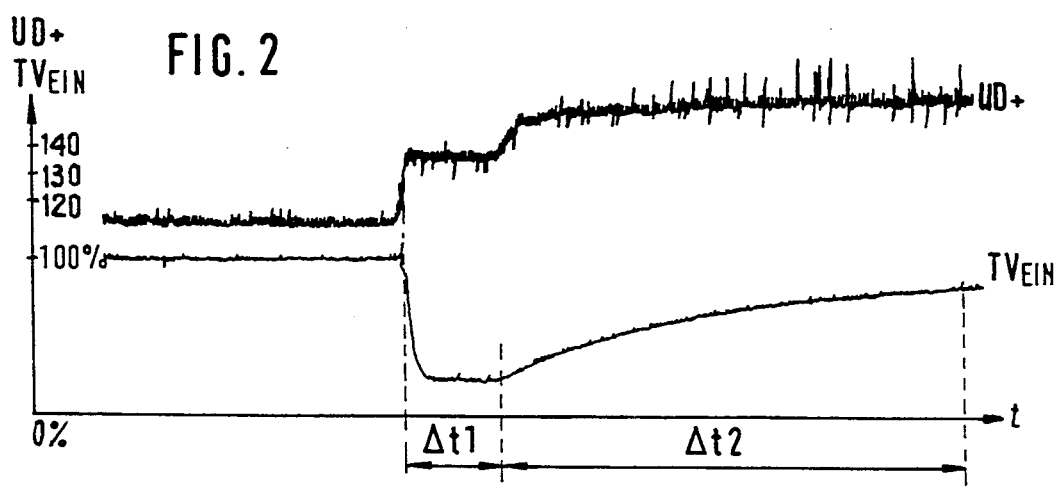
FIG. 2 is a graphical illustration of the method according to the invention showing that the dependence of the voltage UD+ at the terminal D+ on time t and also the IN/OUT ratio $TV_{EIN}$ on time t is limited during the starting phase of the excitation current.

In FIG. 2 the course of the voltage UD+ a the terminal D+ versus time and an IN/OUT ratio $TV_{EIN}$ of the voltage regulator 11 versus time is shown for one experiment case. Before the engine runs an approximately constant voltage dependent on the battery voltage and/or other power supply conditions is set on D+ so that the IN/OUT ratio $TV_{EIN}$ of the voltage regulator 11 would be about 100%, since the generator is not running.

After start of the engine the generator rotates and the voltage at D+ increases. Simultaneously the limitation of the excitation current is started, since the additional controlling means acts on the voltage regulator 11 so that the excitation current drops to a lower value, which during the starting phase Δt1 should prevent current from being delivered to the generator and allows shut off of the charge control signalling means.

During the time interval Δt1, during which the excitation current is maintained reduced or small, it is detected that the voltage UD+ is constant and similarly the ratio IN/OUT of the voltage regulator is kept constant.

After the end of the starting phase, also after elapse of the time interval Δt1, which has already been illustrated, the excitation current is continuously increased during the time interval Δt2 until after elapse of the time interval Δt2 a value has been reached which produces the desired standard generator output voltage. After that the normal voltage control starts.

During the transition phase the voltage UD+ is higher than during the starting phase and reaches the set value after the ending of Δt2. The IN/OUT ratio of the voltage regulator increases during the transition phase and after elapse of the time interval Δt2 the value required by the power supply and/or battery requirements.

It will be understood that each of the elements described above, or two or more together, may also find a useful application in other types of constructions differing from the types described above.

While the invention has been illustrated and described as embodied in an apparatus and method for control of an output voltage of a generator of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Apparatus for controlling an output voltage of a generator of an internal combustion engine having a starter device, comprising a charge control signaling device; an excitation coil of the generator; a voltage regulator circuit means for controlling an excitation current in the excitation coil of the generator; means for detecting expiration of a starting phase (Δt1) of the internal combustion engine; controlling means (25) for limiting the excitation current in the excitation coil during the starting phase (Δt1) of the internal combustion engine to maintain a generator voltage (UD+) at a predetermined fixed value during the starting phase (Δt1); and means for increasing the excitation current after the starting phase (Δt1).

2. Apparatus as defined in claim 1, wherein said controlling means (25) for limiting the excitation current reduces the excitation current during said starting phase (Δt1) so as to reduce a load on said starter device.

3. Apparatus as defined in claim 1, wherein said controlling means (25) for limiting the excitation current defines a limit for the excitation current during said starting phase (Δt1) such that another generator voltage (UB+) is lower than a power supply network voltage during said starting phase (Δt1).

4. Apparatus as defined in claim 1, wherein said controlling means for limiting the excitation current limits said excitation current during said starting phase (Δt1) so that activation of said charge control signaling device is prevented and production of a generator current of said generator is also prevented during said starting phase (Δt1).

5. Apparatus as defined in claim 1 wherein said means for detecting expiration of said starting phase (Δt1) of the internal combustion engine includes means for measuring engine rotation speed to form a measured engine rotation speed and means for comparing said measured engine rotation speed during said starting phase (Δt1) and a predetermined engine rotation speed to detect expiration of said starting phase (Δt1).

6. Apparatus as defined in claim 1, wherein said means for increasing the excitation current after said starting phase continuously increases the excitation current until the excitation current reaches a standard set value.

7. Apparatus as defined in claim 1, wherein said means (25) for limiting is structured to turn off after said predetermined starting phase (Δt1).

8. Apparatus as defined in claim 1, wherein said means for detecting expiration of said starting phase (Δt1) includes means for comparing a measured time with a predetermined time period to detect expiration of said starting phase (Δt1).

9. Apparatus as defined in claim 1, further comprising means for generating and analyzing a characteristic signal used to detect expiration of said starting phase (Δt1).

10. Method of controlling an output voltage of a generator of an internal combustion engine having a starter device, a charge control signaling device, a generator with an excitation coil; a voltage regulator circuit means for controlling the excitation current in said excitation coil of said generator, said method comprising the steps of detecting expiration of a starting phase (Δt1) of the internal combustion engine; limiting the excitation current in the excitation coil during the starting phase (Δt1) of the internal combustion engine to maintain a generator voltage (UD+) at a predetermined fixed value during the starting phase (Δt1) and increasing the excitation current after the starting phase ($\Delta t1$).

11. Method as defined in claim 10, wherein said limiting or the excitation current includes reducing the excitation current during the starting phase ($\Delta t1$) below a standard excitation current produced by said voltage regulator circuit means in the absence of said limiting so as to reduce a load on said starter device.

12. Method as defined in claim 10, wherein said limiting of the excitation current is such that another generator voltage (UB+) is lower than the power supply network voltage during said starting phase ($\Delta t1$).

13. Method as defined in claim 10, wherein said limiting of the excitation current during said starting phase ($\Delta t1$) is such that activation of said charge control signalling device is prevented and production of a generator current of said generator is also prevented during said starting phase ($\Delta t1$).

14. Method as defined in claim 10, wherein said increasing of the excitation current after said starting phase ($\Delta t1$) is continuous during a time interval ($\Delta t2$) until the excitation current reaches a standard set value.

15. Method as defined in claim 10, wherein said limiting the excitation current is terminated after expiration said starting phase ($\Delta t1$).

16. Method as defined in claim 10, further comprising comparing a measured engine rotation speed and a predetermined engine rotation speed to detect expiration of said starting phase ($\Delta t1$).

17. Method as defined in claim 10, further comprising comparing a measured time with a predetermined time period to detect expiration of said starting phase ($\Delta t1$).

18. Method as defined in claim 10, further comprising generating and analyzing a characteristic signal to detect expiration of said starting phase ($\Delta t1$).

* * * * *